(12) United States Patent
Todd et al.

(10) Patent No.: US 6,668,338 B1
(45) Date of Patent: Dec. 23, 2003

(54) DYNAMIC SHORTCUT TO REVERSE AUTONOMOUS COMPUTER PROGRAM ACTIONS

(75) Inventors: Stephen James Todd, Winchester (GB); Graham Derek Wallis, West Wellow (GB)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 09/692,387

(22) Filed: Oct. 19, 2000

(30) Foreign Application Priority Data

Mar. 17, 2000 (GB) .............................................. 0006413

(51) Int. Cl.⁷ ................................................ G06F 11/00
(52) U.S. Cl. ...................................................... 714/19
(58) Field of Search ...................... 714/19, 20; 709/108

(56) References Cited

U.S. PATENT DOCUMENTS

| | | | |
|---|---|---|---|
| 5,355,472 A | * 10/1994 | Lewis | ......................... 707/101 |
| 5,437,026 A | * 7/1995 | Borman et al. | .............. 707/202 |
| 5,953,017 A | 9/1999 | Beach et al. | ................. 345/440 |
| 6,226,694 B1 | * 5/2001 | Constant et al. | ............. 709/400 |
| 6,295,610 B1 | * 9/2001 | Ganesh et al. | ................. 714/19 |
| 6,543,006 B1 | * 4/2003 | Zundel et al. | ................. 714/19 |

* cited by examiner

*Primary Examiner*—Scott Baderman
(74) *Attorney, Agent, or Firm*—David A. Mims, Jr.

(57) ABSTRACT

Disclosed are a method, apparatus, and computer program for, in an end-user computer environment, reversing an effect of an autonomously-initiated program action, by recognizing that the program action is to be performed, recording data representing a state change caused by the program action, providing a user option to cause the computer system to reverse the state change caused by the program action, responsive to a user selection of the user option, retrieving the data representing a state change, and reversing the state change caused by the program action.

27 Claims, 6 Drawing Sheets

DYNAMIC SHORTCUT TO REVERSE AUTONOMOUS COMPUTER PROGRAM ACTIONS

TECHNICAL FIELD OF THE INVENTION

This invention relates to the field of end-user computing, and more particularly to computing in systems or applications in which certain activities are carried out by the system without any direct instruction to do so by a user.

BACKGROUND OF THE INVENTION

Modern end-user application environments frequently incorporate "implicit" program actions that are carried out, not at the direct instigation of a user, but autonomously by the system or application itself. A well-known example is the AUTOSAVE function of many editing environments, in which the application periodically saves the work done so far on a disk, so that it is available for retrieval if the system or application fails before the user has had a chance to perform an explicit save of the data.

In such an environment, it is sometimes also the case that a task will take some action, not as the result of a user request, but as a result of a predetermined time-limit being exceeded, or as an implied result of some other, unrelated user action.

In U.S. Pat. No. 5,953,017 to Beach et al., a method is disclosed for collapsing a portion of a tree-view of objects by selecting a subset of sibling objects and replacing the display of the subset with a new identifier that represents the subset, wherein the new identifier comprises the first object identifier and the last object identifier.

While these autonomous actions are useful in, for example, preserving work that might be lost over a system failure, or saving the user from extra keystrokes, or keeping a screen display free from unnecessary clutter, they may have disadvantages in other respects. In situations in which there is a shortage of disk space, for example, autonomous actions that consume disk space may be undesirable. Also, applications incorporating these autonomous actions, in their attempt to help the user, cannot always accurately predict the user's wishes. When they fail to do so the result may be annoyingly disadvantageous in reducing the ease-of-use characteristics of the system or application. Typically, to reverse the effects of such actions requires several steps to be taken by the user, as, for example, opening separate GUI windows to locate and delete unwanted, autonomously-created files. Additionally, where the autonomous actions can be switched on and off, such a switch is typically used to set an action or actions off for an entire session, or as a system-wide option; in such circumstances, the user must remember to set the switch off for each session and reset it when the autonomous actions are again desired.

In most modern editing environments and graphical user interfaces, it is usual for the application to maintain a history of actions performed by the user, so that they can be reversed. Typically, one of the pull-down menu options (to take an example from a GUI operating system environment) will present the user with a selection option such as UNDO. This is sometimes tailored to include a reference to what the original action was. For example, UNDO MOVE would return an object that had been moved from one position in a file to its original position. It is sometimes possible in these environments to step back through a number of actions by repeated use of the UNDO option. Although this function of undoing user actions is useful, it is limited in its usefulness in modern end-user computing environments in which advanced ease-of-use characteristics have been incorporated.

SUMMARY OF THE INVENTION

In a first aspect the present invention accordingly provides a method for, in an end-user computer environment, reversing an effect of an autonomously-initiated program action, said method comprising the steps of: recognizing that the program action is to be performed; recording data representing a state change caused by the program action; providing a user option to cause the computer system to reverse the state change caused by the program action; responsive to a user selection of the user option, retrieving the data representing a state change; and reversing the state change caused by the program action.

In a method according to the first aspect the step of recording data representing a state change preferably further comprises: recording data representing a before state; and recording data representing an after state.

The step of recording data representing a state change caused by the program action preferably further comprises: determining that the state change includes a sequenced plurality of actions; and recording a corresponding sequenced plurality of reversing actions.

The step of reversing the state change caused by the program action preferably further comprises: determining that the state change included a sequenced plurality of actions; and executing a corresponding sequenced plurality of reversing actions.

The method of the first aspect is preferably further characterized in that said step of reversing comprises re-expanding a collapsed subtree of a tree structure.

The method of the first aspect is preferably further characterized in that said step of reversing comprises re-unfolding a folded section of data in a folding editor.

The method of the first aspect is preferably further characterized in that said step of reversing comprises redisplaying a graphics viewport at a previous zoom value.

The method of the first aspect is preferably further characterized in that said step of reversing comprises deleting autonomously-created data from a store.

The method of the first aspect is preferably further characterized in that said step of providing a user option comprises providing an active menu element.

The method of the first aspect is preferably further characterized in that said step of providing a user option comprises providing an active keyboard shortcut.

The method of the first aspect is preferably further characterized in that said step of providing a user option comprises providing an active voice-response element.

The method of the first aspect is preferably further characterized in that said step of providing a user option comprises providing an active screen display element.

In a second aspect, the present invention provides apparatus, in an end-user computer environment, for reversing an effect of an autonomously-initiated program action, said apparatus comprising: means for recognizing that the program action is to be performed; means for recording data representing a state change caused by the program action; means for providing a user option to cause the computer system to reverse the state change caused by the program action; means, responsive to a user selection of the user option, retrieving the data representing a state change; and means for reversing the state change caused by the program action.

The apparatus of the second aspect preferably further comprises features corresponding to those features stated to be preferred in the first aspect.

BRIEF DESCRIPTION OF THE DRAWINGS

A preferred embodiment of the present invention will now be described by way of example, with reference to the accompanying drawings in which.

DETAILED DESCRIPTION OF THE PREFERRED EMBODIMENTS

Figure 1:
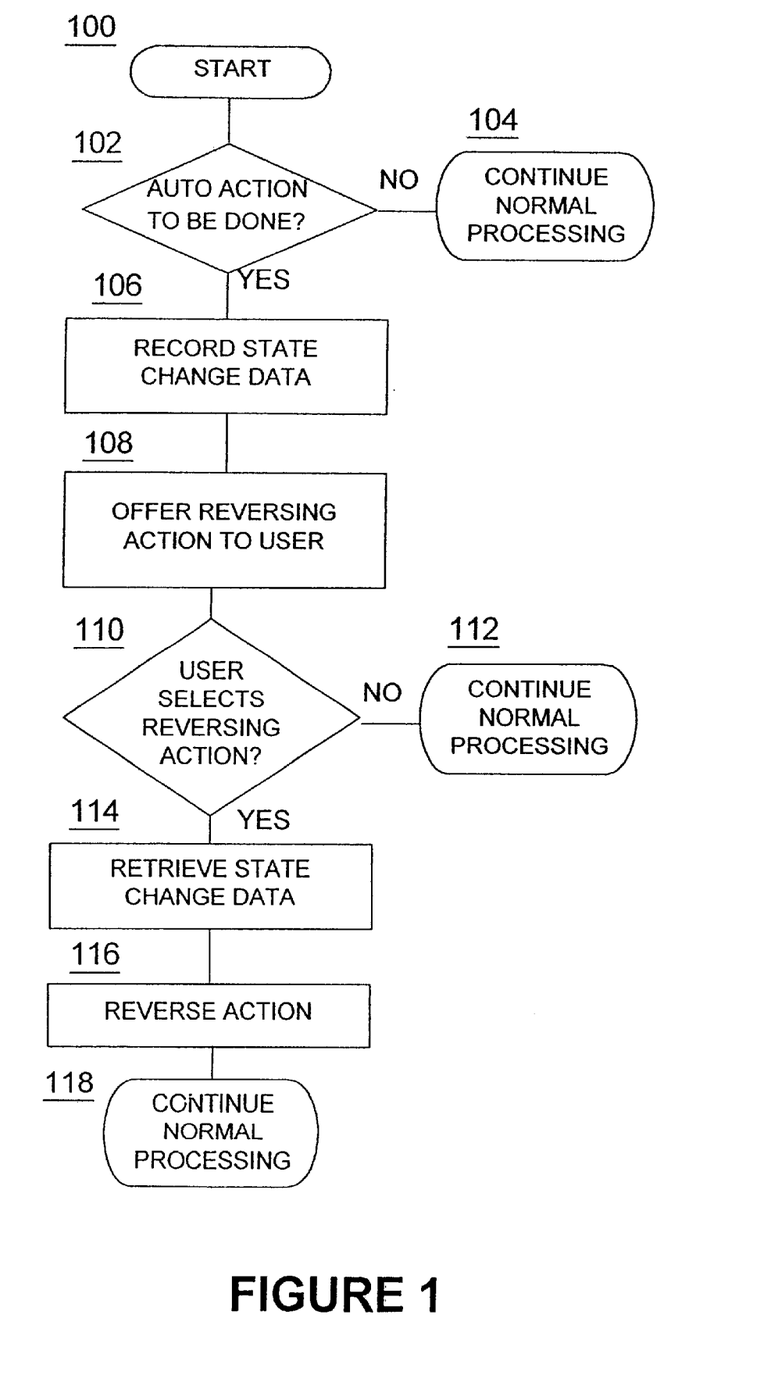
FIG. 1 shows a flow diagram of the steps of a method according to a preferred embodiment of the present invention.

In FIG. 1, the sequence of steps begins with START, at step (100). In step (102) the system or application tests whether an autonomous program action is to be performed. If so, at step (106), the application records data representing the state change associated with the autonomous action. This may take the form of a data record in volatile or non-volatile storage. At step (108), the application offers the reversing action to the user by means of a shortcut of some type. Typically, this would be an active keyboard shortcut, an active display element, or the like. A test is set at step (110) to determine subsequent processing. If the user does not select the reversing action, processing continues normally at step (112). If the user does select the reversing action, the application retrieves the state change data at step (114) and acts upon it to reverse the action at step (116). Normal processing continues at step (118).

In this description, the state change log or log-pair is used as the means of leaving a "footprint" showing a change that can be reversed. Those skilled in the art will understand that this is merely one embodiment of the invention. An equally useful method is to retain in storage, for example, a command or command script that has the effect of reversing a previous command. If the method of the invention were to be applied to the case of an AUTOSAVE action (useful if the system may be short on disk space, or where there is a security risk to files saved on disk), for example, the system or application might have issued a CREATE FILE command, followed by a series of WRITE FILE RECORD commands. The provision of a reversing option might thus require a DELETE FILE command to reverse the effect of the AUTOSAVE. Similarly, there are a number of ways of offering the user the reversing option. For example it could be offered as a button on a desktop screen, a pull-down menu option, a command-line command, a keyboard shortcut key or key combination, a voice command or in any other way that is suitable to the system or application environment.

Figure 2:
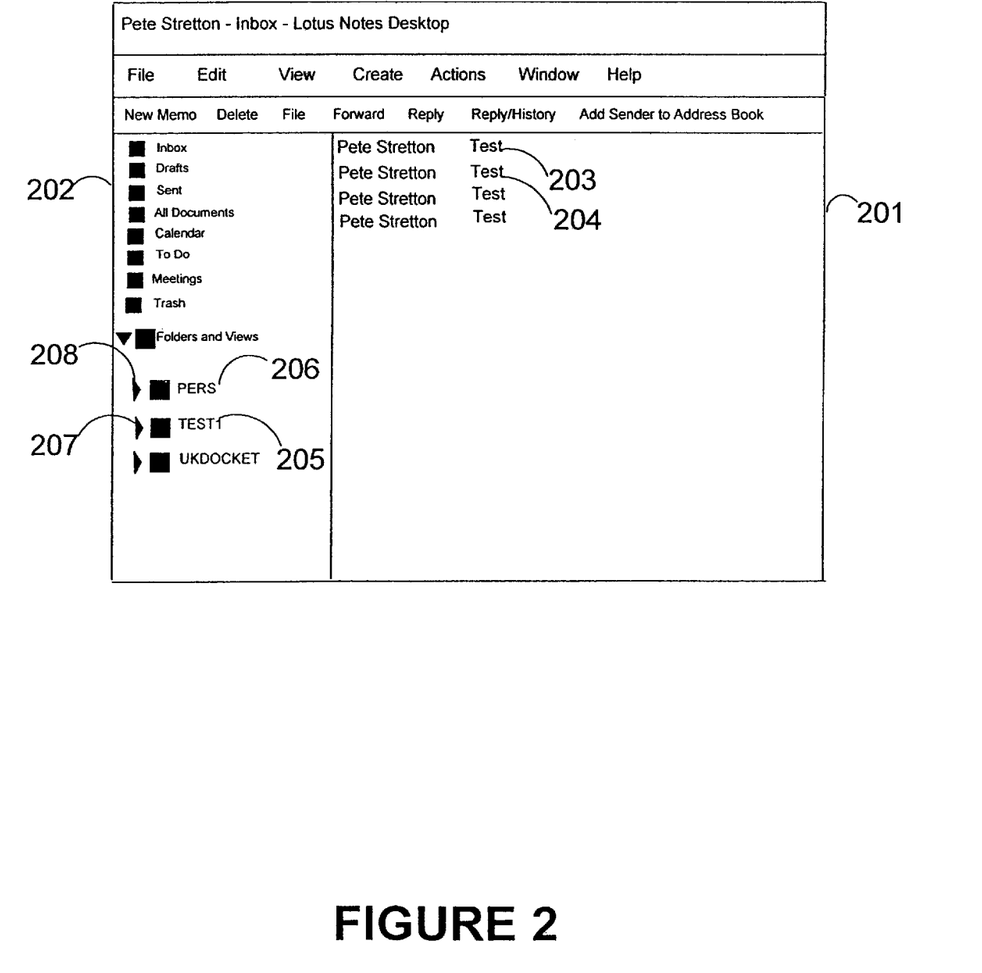
FIGS. 2, 3 and 4 shows screen displays during operation of a method according to a preferred embodiment of the present invention.
Figure 3:
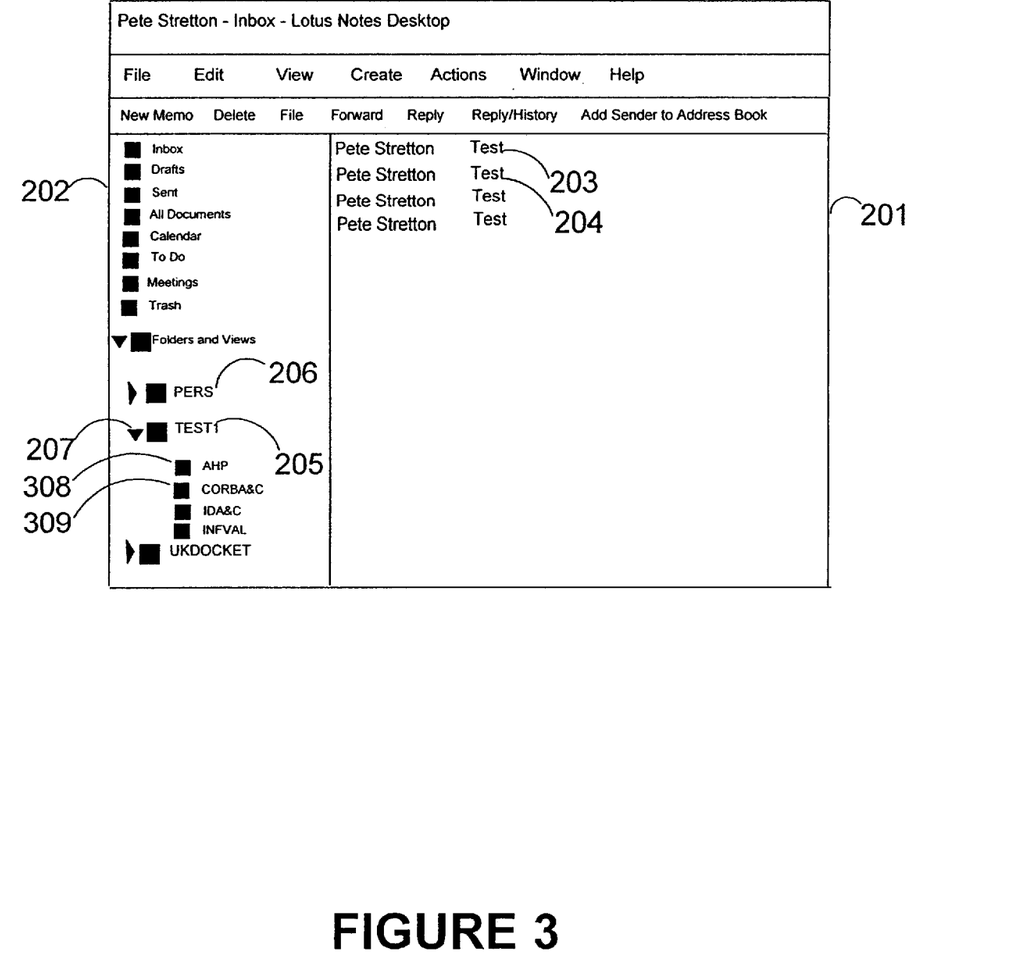

To use a concrete example, consider FIG. 2, which shows a GUI window having two panes (201, 202). In pane (201) there are files (203, 204). In this GUI window, a file hierarchy is represented by a tree structure comprising nodes which may be expanded to show their subtrees and collapsed again when no longer needed. In panel (202), folders PERS (206) and TEST1 (205) have beside them triangular "twist-ies" (207, 208), indicating that they represent the roots of subtrees that are not presently shown on the display. (The word "twistie" refers to the small symbol shown next to an object name when that object comprises sub-objects. The orientation of the twistie indicates whether or not the sub-objects are shown. Clicking on a closed twistie typically opens it up to show the sub-objects, whereas clicking on an open twistie typically closes it, so that the sub-objects are no longer shown.) Working in a window of the preferred embodiment, a user now drags file (203) over to folder TEST1 (205) and "hovers" over it with the pointing device. The state of the window now changes to that shown in FIG. 3. FIG. 3 shows a window having panes, files and folders corresponding to those shown in FIG. 2, with corresponding numbers. In FIG. 3, however, the subtree beneath folder TEST1 (205) has been expanded and shown on the display. In folder TEST1 (205) are shown lower-level folders including folders AHP (308) and CORBA&C (309). The "twistie" (207) beside folder TEST1 now points downward, indicating that the folder beside it has been expanded to show the subtree below.

The user now decides not to drop dragged file (203) into a folder in the expanded subtree below folder TEST1 (205), and returns it to its place in pane (201). In the older known art, an expanded subtree remained in the same expanded state until explicitly collapsed by a user clicking on its "twistie". More recently, as mentioned in the US patent to Beach et al. referred to above, the idea has been developed of automatically collapsing subtrees which are infrequently used.

Figure 4:
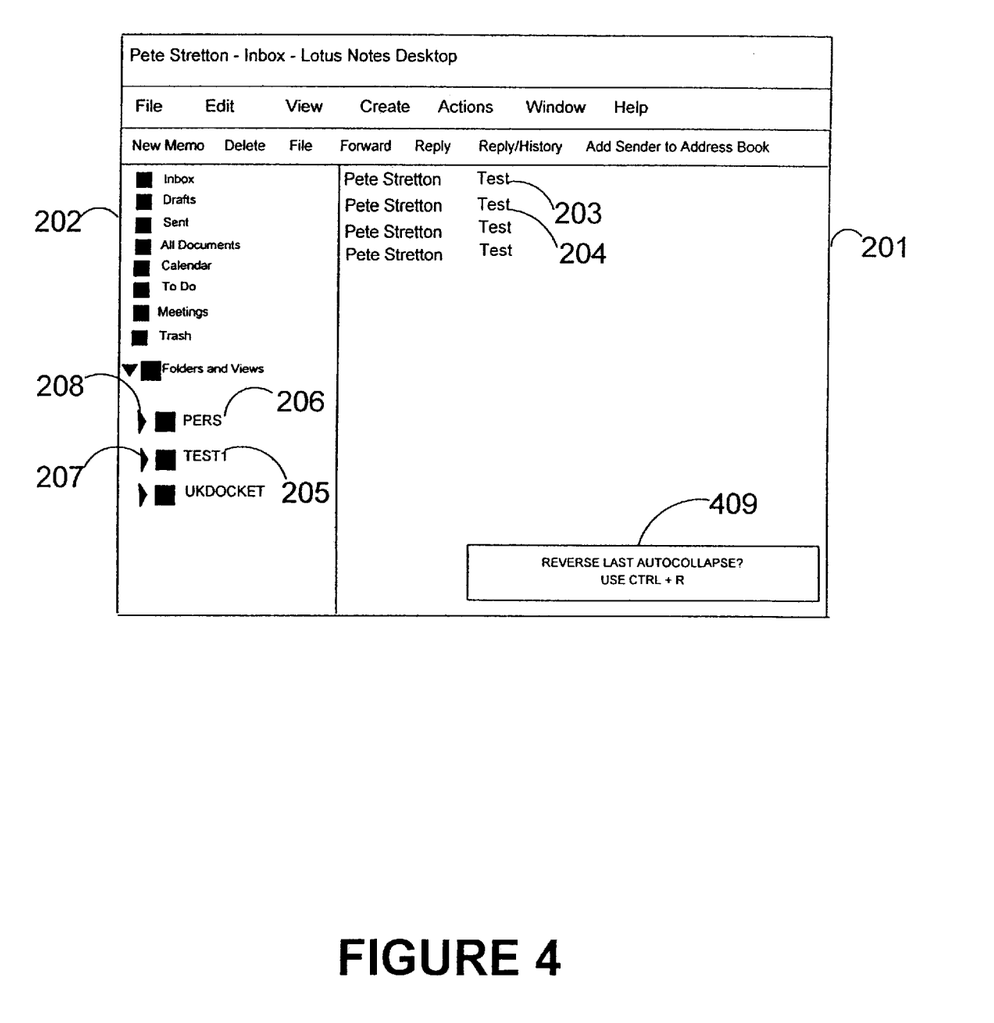

FIG. 4 contains elements corresponding to those in FIGS. 2 and 3, and numbered correspondingly. In FIG. 4, folder TEST1 (205) has been automatically collapsed as a result of an autonomous decision by the application to do so after the determined time period.

In an application that incorporates such an autonomous action to collapse unused subtrees after a determined timeout interval, users who have turned aside to answer the telephone may turn back to find that they have lost their places in the hierarchy of trees and subtrees. Such a situation can be disadvantageous in a complex display of a large file hierarchy.

In the preferred embodiment of the present invention, the state change between FIGS. 3 and 4 can be stored in the form of a representation of the expanded subtree and its corresponding collapsed form as a node of a tree. Alternatively, it can be stored as a command or command sequence that would have the effect of permitting the autonomously-collapsed subtree to be re-expanded. In either case, a shortcut to allow the user to re-expand the subtree can be offered as a single user action, which, if selected, returns the subtree to its expanded form. The shortcut can be offered to the user in any of the forms available, whether as a button on the screen, as a keyboard shortcut, a mouse-button shortcut, a voice command, or in any other appropriate way. In a preferred embodiment, the shortcut is offered as a keyboard shortcut combination of the Control and R keys. This is shown in a pop-up help box (409) offering the user the option of using the keyboard shortcut (Ctrl+R) to reverse the last autocollapse. Advantageously, this option allows a user to return the display to its previous state without having to remember any of the previous steps taken by the user that led to that state.

Clearly, those skilled in the art will see that the invention has numerous possible embodiments and applications, as for example:

1. In a folding editor, beginning with some section folded, a user performs a search. The folded section is opened in order to show a line that satisfies the search. The user continues the search, and the line is no longer selected. By an implicit program action, the section is automatically refolded. The editor saves a shortcut to undo the system-initiated refold and offers it to the user.

2. In a graphics editor, a user can see most of a picture. The user zooms to one particular section, and then keeps moving about, so that there are many screen redraws. The program detects this excess of screen redraw actions and automatically decides to zoom out a little, to save the user extra navigation. The editor saves a shortcut to undo the system-initiated zoom out and offers it to the user.

3. A database manager program automatically decides to index a particular field based on a user query pattern. This ease-of-use characteristic may in some cases be undesirable. A user may know that the pattern of queries is likely to change in the future, or there may be inadequate disk space to save automatically-created indexes. The database manager program saves a shortcut to undo the indexing action and offers it to the user.

Figure 5:
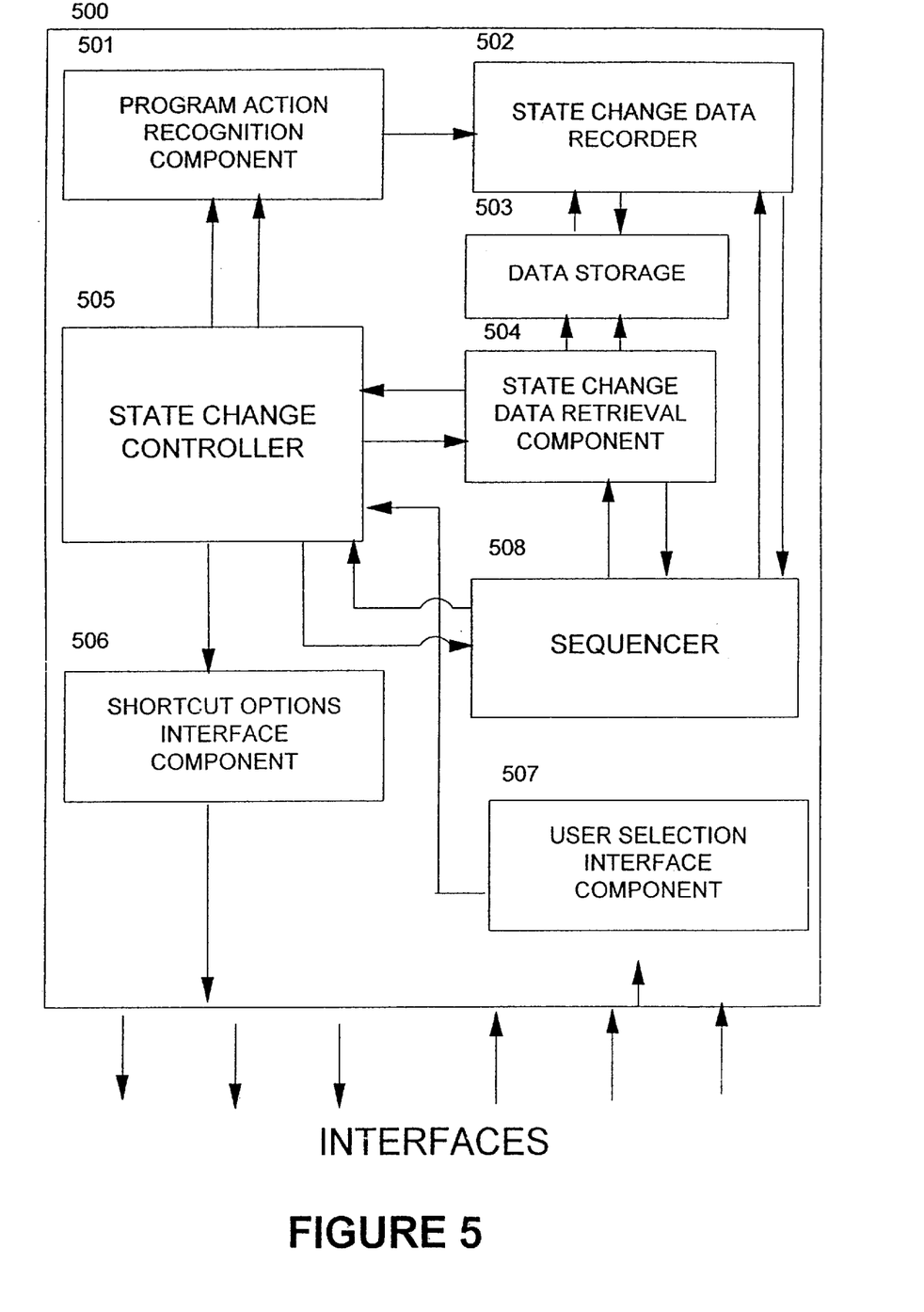
FIG. 5 shows a block diagram of apparatus according to a preferred embodiment of the present invention.
Figure 6:
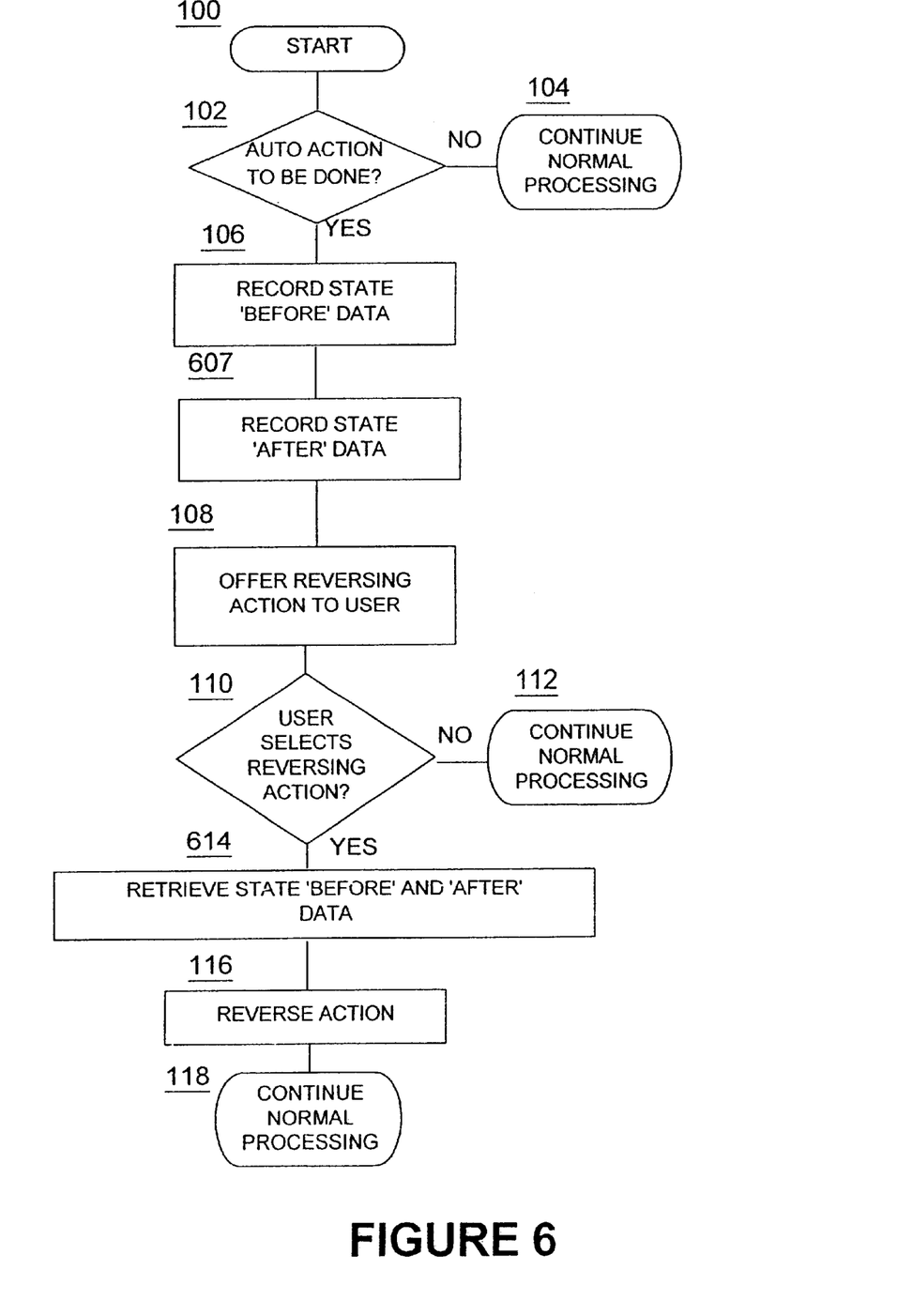
FIG. 6 shows a flow diagram of the steps of a method according to a further preferred embodiment of the present invention.

Those skilled in the art will readily observe that the invention may be embodied in a computer program product stored on a computer-readable medium or incorporated in a signal for causing a computer to perform the steps herein described. The invention may also be incorporated in any appropriate form of programmable computing apparatus. The components necessary to achieve this are shown in FIG. 5, in which is shown apparatus (500) having a program action recognition component (501) for recognizing that an autonomous program action is to be performed. When component (501) recognizes that such an action is to be performed, it passes control to state change data recorder (502), which records the state change data in data storage (503). If state change data recorder (502) recognizes that a state change is represented by a sequence of actions, sequencer (508) is activated to organize the sequence of data prior to the storage of state change data in data storage (503) by state change data recorder (502).

State change controller (505) passes control to a shortcut options interface component (506), which offers the user the option of reversing the autonomous action. If a user chooses the reversing option at user selection interface component (507), state change controller (505) passes control to state change data retrieval component (504), which retrieves state change data from data storage (503). If state change data retrieval component (504) recognizes that the state change requires a sequence of actions to be reversed, sequencer (508) is activated to construct the sequence of actions required to perform the reversing action from the state change data retrieved from data storage (503). State change controller (505) then performs the reversing action or actions required to reverse the state change.

The present invention is preferably embodied as a computer program product for use with a computer system. Such an implementation may comprise a series of computer readable instructions either fixed on a tangible medium, such as a computer readable medium, e.g., diskette, CD-ROM, ROM, or hard disk, or transmittable to a computer system, via a modem or other interface device, over either a tangible medium, including but not limited to is optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

We claim:

1. A method for, in an end-user computer environment, reversing an effect of an autonomously-initiated program action, said method comprising the steps of:
   recognizing that the program action is to be performed;
   recording data representing a state change caused by the program action;
   providing a user option to cause the computer system to reverse the state change caused by the program action; and
   responsive to a user selection of the user option, reversing the state change caused by the program action.

2. A method as claimed in claim 1, wherein the step of recording data representing a state change further comprises:
   recording data representing a before state; and
   recording data representing an after state.

3. A method as claimed in claim 1, wherein the step of recording data representing a state change caused by the program action further comprises:
   determining that the state change includes a sequenced plurality of actions; and
   recording a corresponding sequenced plurality of reversing actions.

4. A method as claimed in claim 2, wherein the step of recording data representing a state change caused by the program action further comprises:
   determining that the state change includes a sequenced plurality of actions; and
   recording a corresponding sequenced plurality of reversing actions.

5. A method as claimed in claim 3, wherein the step of reversing the state change caused by the program action further comprises:
   determining that the state change included a sequenced plurality of actions; and
   executing a corresponding sequenced plurality of reversing actions.

6. A method as claimed in claim 1, further characterized in that said step of reversing comprises re-expanding a collapsed subtree of a tree structure.

7. A method as claimed in claim 1, further characterized in that said step of reversing comprises re-unfolding a folded section of data in a folding editor.

8. A method as claimed in claim 1, further characterized in that said step of reversing comprises redisplaying a graphics viewport at a previous zoom value.

9. A method as claimed in claim 1, further characterized in that said step of reversing comprises deleting autonomously-created data from a store.

10. A method as claimed in claim 1, further characterized in that said step of providing a user option comprises providing an active menu element.

11. A method as claimed in claim 1, further characterized in that said step of providing a user option comprises providing an active keyboard shortcut.

12. A method as claimed in claim 1, further characterized in that said step of providing a user option comprises providing an active voice-response element.

13. A method as claimed in claim 1, further characterized in that said step of providing a user option comprises providing an active screen display element.

14. Apparatus, in an end-user computer environment, for reversing an effect of an autonomously-initiated program action, said apparatus comprising:

means for recognizing that the program action is to be performed;

means for recording data representing a state change caused by the program action;

means for providing a user option to cause the computer system to reverse the state change caused by the program action;

means, responsive to a user selection of the user option, retrieving the data representing a state change; and means for reversing the state change caused by the program action.

15. Apparatus as claimed in claim 14, wherein the means for recording data representing a state change further comprises:

means for recording data representing a before state; and means for recording data representing an after state.

16. Apparatus as claimed in claim 14, wherein the means for recording data representing a state change caused by the program action further comprises:

means for determining that the state change includes a sequenced plurality of actions; and means for recording a corresponding sequenced plurality of reversing actions.

17. Apparatus as claimed in claim 14, wherein the means for reversing the state change caused by the program action further comprises:

means for determining that the state change included a sequenced plurality of actions; and means for executing a corresponding sequenced plurality of reversing actions.

18. Apparatus as claimed in claim 14, further characterized in that the means for reversing comprises means for re-expanding a collapsed subtree of a tree structure.

19. Apparatus as claimed in claim 14, further characterized in that said means for reversing comprises means for re-unfolding a folded section of data in a folding editor.

20. Apparatus as claimed in claim 14, further characterized in that said means for reversing comprises means for redisplaying a graphics viewport at a previous zoom value.

21. Apparatus as claimed in claim 14, further characterized in that said means for reversing comprises means for deleting autonomously-created data from a store.

22. Apparatus as claimed in claim 14, further characterized in that said means for providing a user option comprises means for providing an active menu element.

23. Apparatus as claimed in claim 14, further characterized in that said means for providing a user option comprises means for providing an active keyboard shortcut.

24. Apparatus as claimed in claim 14, further characterized in that said means for providing a user option comprises means for providing an active voice-response element.

25. Apparatus as claimed in claim 14, further characterized in that said means for providing a user option comprises means for providing an active screen display element.

26. A computer program product tangibly recorded on a computer readable medium, comprising computer program code means to cause said computer to perform the steps of a method as claimed in claim 1.

27. A computer program element comprising computer program code means to cause said computer to perform the steps of a method as claimed in claim 1.

* * * * *